(12) United States Patent
Freund

(10) Patent No.: US 7,853,461 B2
(45) Date of Patent: Dec. 14, 2010

(54) RISK SHIFTING METHOD FOR INVESTMENTS IN WIND POWER GENERATION

(76) Inventor: David E. Freund, 8 Embassy Ct., Armonk, NY (US) 10504

( * ) Notice: Subject to any disclaimer, the term of this patent is extended or adjusted under 35 U.S.C. 154(b) by 479 days.

(21) Appl. No.: 12/033,659

(22) Filed: Feb. 19, 2008

(65) Prior Publication Data

US 2008/0140457 A1 Jun. 12, 2008

Related U.S. Application Data

(63) Continuation-in-part of application No. 10/894,384, filed on Jul. 19, 2004, now abandoned.

(60) Provisional application No. 60/488,069, filed on Jul. 17, 2003.

(51) Int. Cl.
*G06Q 40/00* (2006.01)
(52) U.S. Cl. ............................................ 705/4; 705/35
(58) Field of Classification Search .................... 705/4, 705/35
See application file for complete search history.

(56) References Cited

U.S. PATENT DOCUMENTS 6,347,302 B1  2/2002  Joao

| | | |
|---|---|---|
| 2002/0032586 A1 | 3/2002 | Joao |
| 2002/0084655 A1 | 7/2002 | Lof et al. |
| 2002/0103852 A1 | 8/2002 | Pushka |
| 2002/0174042 A1 | 11/2002 | Arena et al. |
| 2002/0174046 A1 | 11/2002 | Mistretta |
| 2002/0194113 A1 | 12/2002 | Lof et al. |
| 2003/0093345 A1 | 5/2003 | Cutbirth |
| 2004/0122755 A1 | 6/2004 | Bates et al. |
| 2006/0015426 A1 | 1/2006 | Freund |

OTHER PUBLICATIONS

"Revenue Procedure Establishes a Safe Harbor for 'Partnership Flip' Strucutes in Wind Projects." *BakerBotts L.L.P.* Oct. 2007 <http://www.bakerbotts.com/file_upload/SafeHarborforPartnershipFlipStructuresinWindDeals.htm>.
"AWEA 3rd Quarter 2007 Market Report," *American Wind Energy Association*, Nov. 7, 2007.

*Primary Examiner*—Thu Thao Havan

(57) ABSTRACT

Systems and methods for shifting risk in investments in wind power generation are disclosed herein. In some embodiments, methods for shifting at least a portion of an investment risk in a wind power generation project include calculating a return floor amount associated with the wind power generation project, accepting a premium payment amount from an investor in the wind power generation project, and for each of an agreed period within an agreed term, paying the investor a difference between the return floor amount and a realized amount if the return floor amount is greater than the realized amount.

28 Claims, 9 Drawing Sheets

RISK SHIFTING METHOD FOR INVESTMENTS IN WIND POWER GENERATION

CROSS REFERENCE TO RELATED APPLICATION

This application is a Continuation in Part of U.S. patent application Ser. No. 10/894,384, filed on Jul. 19, 2004, now abondoned which claims priority of U.S. Provisional Patent Application Ser. No. 60/488,069, filed on Jul. 17, 2003, which is hereby incorporated by reference in its entirety.

BACKGROUND

The disclosed subject matter relates to methods and systems to shift at least a portion of an investment risk in a wind power generation project.

There exist at least two types of investors, Debt Investors and Equity Investors. An Equity Investor, as opposed to a Debt Investor, will generally bear the economic risk of a project or investment. In this regard, two premises of corporate finance are applicable to the disclosed subject matter: investors will typically try to diminish any risk that they are not in business to take; and different parties view the same risks differently, such that a particular risk may be material to one party, but not material to another. As such, the amount of investment that an Equity Investor can make in a project may be limited by his/her ability to calculate and bear the risk of the project. This may be particularly true with complex investments, such as those connected with wind power generation.

Investing in wind power generation may be difficult because of, for example: i) the nature of the variability of wind ii) the equipment risk involved with wind turbine generators, iii) other operational risk, and iv) the nature of the current tax regime in the United States with production tax credits under 26 U.S.C. §45. For example, under 26 U.S.C. §45, which governs the tax credits available for investors in renewable energy, in order to qualify for certain tax credits, the investor(s) must be the owner(s) of the facility, and may be required to bear the majority of the risks and benefits of ownership.

Because of these and other reasons, prior to the disclosed subject matter, an investor would need to accumulate the requisite familiarity with many facets of wind power generation in order to make appropriate investment decisions. This can result in fewer investors, as well as smaller investment amounts, in wind power generation.

SUMMARY

Systems and methods for shifting risk in investments in wind power generation are disclosed herein.

In some embodiments, methods for shifting at least a portion of an investment risk in a wind power generation project include calculating a return floor amount associated with the wind power generation project, accepting a premium payment amount from an investor in the wind power generation project, and for each of an agreed period within an agreed term, paying the investor a difference between the return floor amount and a realized amount if the return floor amount is greater than the realized amount. In some embodiments, the return floor amount is in proportion to an amount which can be one of the following: a desired value of tax credits earned by said wind power generation project; a desired value of pre-tax cash-flow associated with said wind power generation project; a desired value of post-tax cash-flow associated with said wind power generation project; and a desired value of dividends resulting from said wind power generation project. In some embodiments the realized amount is equal to an amount which can be one of the following: an actual value of tax credits earned by said wind power generation project; an actual value of pre-tax cash-flow produced by said wind power generation project; an actual value of post-tax cash-flow produced by said wind power generation project; and an actual value of dividends resulting from said wind power generation project. In some embodiments, the premium payment amount is accepted during each of the agreed periods within the agreed term. In some embodiments, the premium payment amount is calculated based at least in part upon a probability that the realized amount will be less than the return floor amount. Some embodiments include obtaining at least one risk mitigant, which can be one of the following: a wind variability swap; a warranty from the original equipment manufacturer or an insurance contract from a third party providing similar protection covering at least a portion of power generation equipment used in said wind power generation project; a tax indemnification associated with said wind power generation project; an insurance policy covering at least one business risk associated with said wind power generation project; and a residual value guarantee. In some embodiments, the agreed term is 5 years, while in other embodiments the agreed term is 10 years.

In some embodiments, methods for shifting at least a portion of an investment risk in a wind power generation project include calculating a return floor amount associated with the wind power generation project, paying a premium payment amount to a guarantor, for each of an agreed period within an agreed term, receiving from the guarantor a difference between the return floor amount and a realized amount if the return floor amount is greater than the realized amount. Some embodiments include obtaining at least one risk mitigant, which can be selected from the following: a wind variability swap, a warranty covering at least a portion of power generation equipment used in the wind power generation project, a tax indemnification associated with the wind power generation project, an insurance policy covering at least one business risk associated with the wind power generation project, and a residual value guarantee.

In some embodiments, methods of facilitating the purchase of renewable energy includes receiving a fixed payment amount from a public utility company, the public utility company entering a power purchase agreement with a renewable energy supplier to receive a supply of energy and renewable energy attributes, and issuing fixed and/or floating rate debt to municipal bondholders, providing a guarantee to the public utility company that the supply of energy or the renewable energy attributes will meet an agreed floor amount, and the public utility company executing an interest rate swap-to-fixed if the debt is floating rate debt. Some embodiments include paying the public utility company at least one contingent payment if the agreed floor amount is greater than the supply of energy or the renewable energy attributes. Some embodiments include arranging a credit enhancement for risks of the renewable energy supplier held by the public utility company.

In some embodiments, methods of facilitating the purchase of renewable energy include receiving a fixed payment amount from a renewable energy provider, the renewable energy provider entering a power purchase agreement with a public utility company to provide a supply of energy and renewable energy attributes, and the public utility issuing fixed and/or floating rate debt to municipal bondholders, providing a guarantee to the renewable energy provider that the supply of energy or the renewable energy attributes will meet an agreed floor amount, and the public utility company, if the debt is floating rate, executing an interest rate swap-to-fixed on the floating rate debt. Some embodiments include paying the renewable energy provider and the municipal bondholders at least one contingent payment if the agreed floor amount is greater than the supply of energy or the renewable energy attributes. Some embodiments include arranging a credit enhancement for risks of the renewable energy supplier held by the public utility company. Some embodiments include the credit enhancement flowing through the renewable energy supplier for the benefit of the investors and the public utility.

BRIEF DESCRIPTION OF THE DRAWINGS

Further objects, features and advantages of the disclosed subject matter will become apparent from the following detailed description taken in conjunction with the accompanying figures showing an embodiment of the invention of which.

DETAILED DESCRIPTION OF THE DRAWINGS

Figure 1:
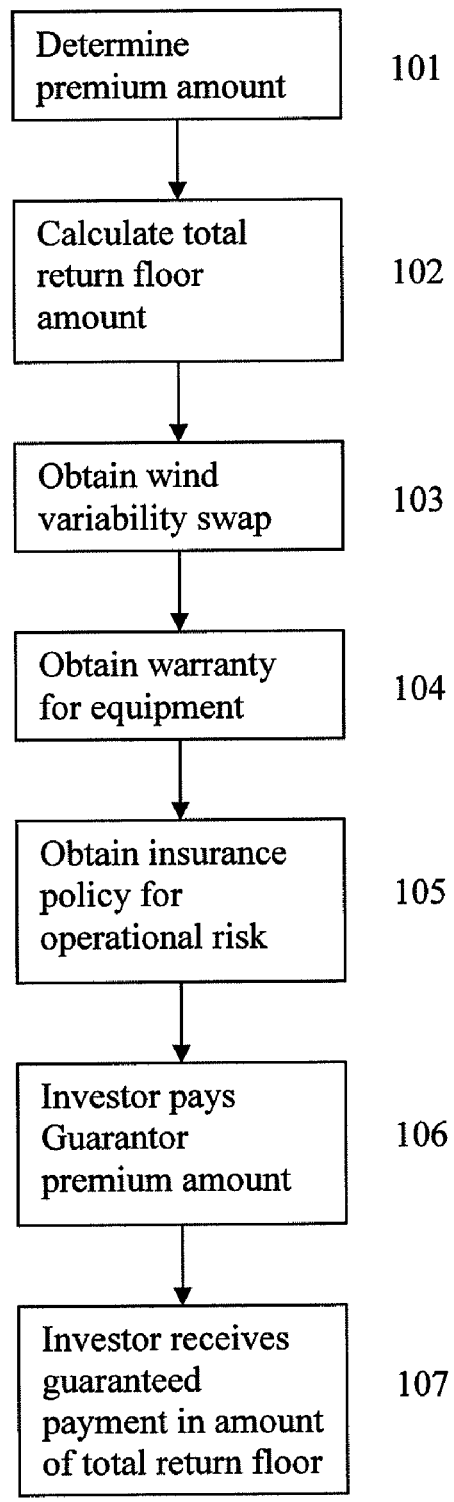
FIG. 1 is a flow chart depicting an embodiment of the disclosed subject matter in which the risk of an investment in wind power generation is shifted.

The disclosed subject matter provides a method and system of shifting at least a part of a wind power generation project investor's risk to a guarantor. Typically, an investor in a wind power generation project will not have the requisite knowledge and/or experience to adequately assess the risk associated with such an investment. However, to address this problem, such an investor can receive a guarantee, which may be backed by a letter of credit or other acceptable collateral, from a guarantor who possesses the requisite knowledge and tools to assess and hedge against the risk associated with a wind power generation project. Thus, while an investor may not be in the business to take all of the risk associated with a wind power generation project, he/she can still invest in a wind power generation project.

In one embodiment, an investor and a guarantor can agree on a specific return floor amount, or minimum total return. That return floor amount can be based on a desired value of tax credits, pre-tax cash-flow, post-tax cash-flow, dividends, or any other anticipated benefit resulting from the wind power generation project. After considering the risks, the guarantor and investor can agree on a premium amount to be paid to the guarantor and a term for the guarantee. For each period, the length of which is agreed upon by the investor and guarantor, within the guarantee term, the guarantor will pay the investor an amount necessary to ensure that the return floor amount is met. Thus, if the return floor amount is surpassed, the guarantor will owe the investor nothing, but if it is not met, the guarantor will pay the investor the difference. For example, if the return floor amount is $1 million in dividends, and the investor only receives $750,000 in dividends from the project for a period, the guarantor will pay the investor $250,000 to meet the return floor amount. However, considering that same scenario, if the dividends for a given period are $1.2 million, then the guarantor would pay the investor nothing.

To hedge his/her own risks, the guarantor can obtain certain structural supports in the form of wind-variability swaps, tax indemnification, warranties for the equipment involved in the project, insurance covering other business risks, and residual value guarantees. In other embodiments, the guarantor may require the investor(s) to enter into the above structural supports with terms and conditions that meet the guarantor's criteria. In either embodiment, the investor can choose to pay the guarantor to bundle all of the counterparty risks associated with the risk mitigation. In such embodiment, the guarantor will be taking the risk that the provider of the risk mitigation is not able to make a valid payment due under the risk mitigation contract(s). For example, the guarantor is not taking the wind variability risk, but rather the contingent risk that the wind speed is below the threshold level and the wind swap provider is financially unable to pay.

With the disclosed subject matter, while the risk associated with the wind power generation project can be shifted, it is replaced by counterparty risk, or the risk that the counterparty will not be able to fulfill its obligations. The counterparty risk to the investor in the disclosed embodiment is that the guarantor will not be able to make the guaranteed payments, should they be needed, at which time the investor would have to rely solely on the returns generated by the wind power generation project itself. However, counterparty risk can be more easily analyzed by typical investors, especially institutional investors, than wind power generation project risk.

FIG. 1 depicts a flow chart showing an embodiment of the disclosed subject matter. At 101, the premium amount is determined. At 102, the total return floor amount is calculated based upon a minimum dollar amount for tax credits earned based on the project's power sales, a pre-tax cash flow amount associated with the project, a post-tax cash flow amount associated with the project, or a dollar amount for project dividends to be paid to the investor. The premium amount can be calculated based, at least in part, upon a probability that a realized amount will be less than the return floor amount. At 103, the guarantor obtains a wind variability swap. At 104, the guarantor obtains a warranty for power generation equipment used on the project. At 105, the guarantor obtains insurance for an operational risk component associated with the project. At 106, the investor pays the guarantor an agreed upon premium amount. Finally, at 107, the investor receives at least one guaranteed payment of the total return floor amount.

In one embodiment of the disclosed subject matter, tax credits under 26 U.S.C. §45 may only be received by an investor in wind power generation when that investor assumes a certain threshold of both the risk and benefits of the wind power generation project. As such, an investor in wind power generation may need to be able to take the wind variability risk, technology risk, and any other risk associated with the wind generation project in order to maintain an active ownership position. In accordance with that embodiment of the disclosed subject matter, a guarantor may provide a guarantee such that the risks are allocated to third parties in such a way that the investor takes the majority of the project risk. The investor can actively manage the risk by entering into a series of third-party structural supports. In this embodiment, the guarantor may act as a risk manager in providing criteria for the investor to follow in contracting for the structural supports. The enforceability of the guarantee can depend upon whether the prescribed structural supports are in place and the criteria are met.

Figure 2:
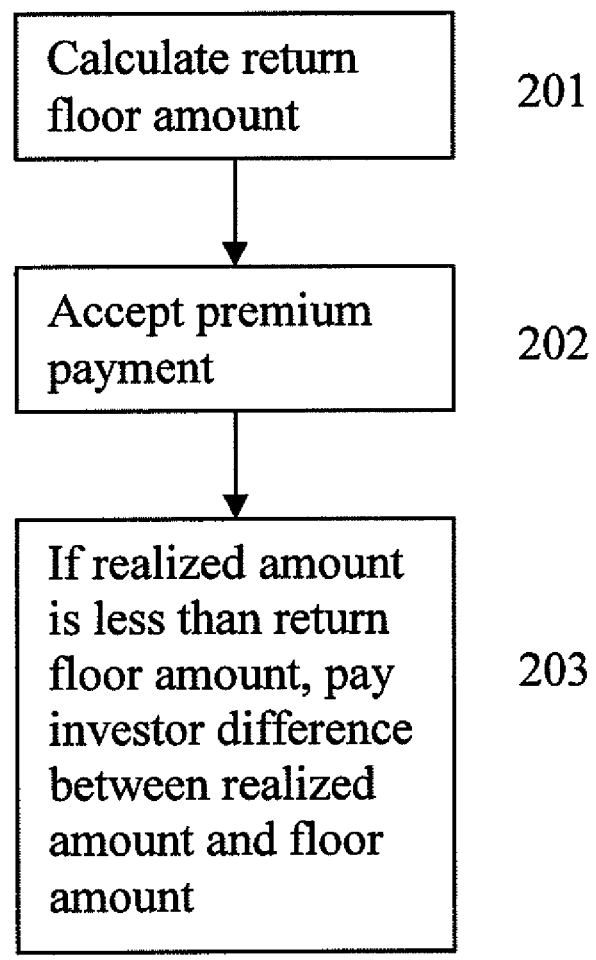
FIG. 2 is a flow chart depicting a second embodiment of the disclosed subject matter in which the risk of an investment in wind power generation is shifted.
Figure 3:
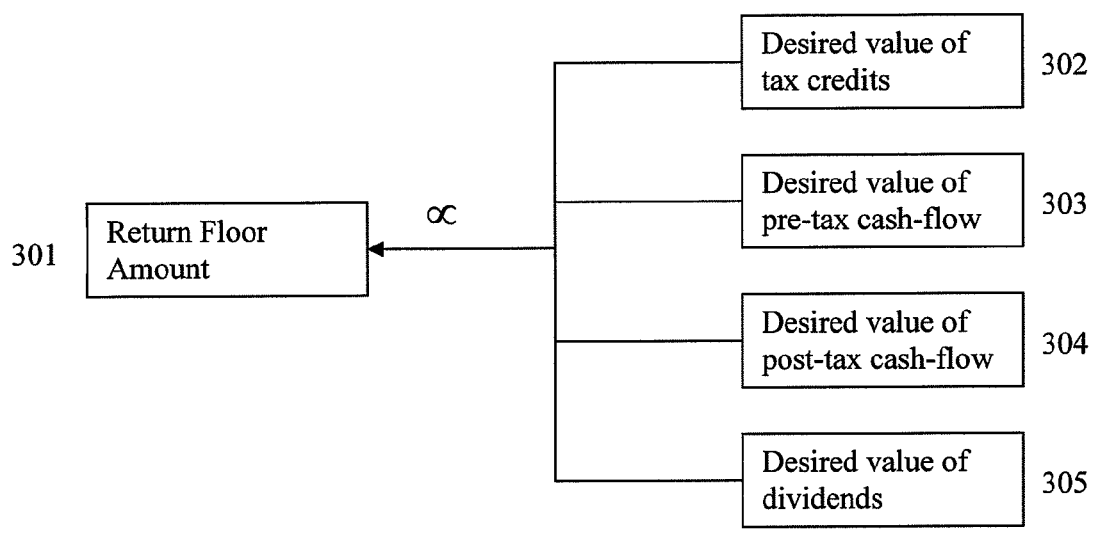
FIG. 3 is a flow chart depicting an embodiment of the disclosed subject matter in which the return floor amount is calculated.

FIG. 2 is a flow chart depicting an example embodiment of the disclosed subject matter. At 201, a return floor amount is calculated and agreed upon by an investor and guarantor. The return floor amount can represent a minimum total return that the investor can expect to receive from his/her investment, providing a quantifiable hedge for the operational risk, and can be calculated as proportional to any metric which may represent a desired benefit to be derived from the wind power generation project. FIG. 3 depicts an embodiment of the disclosed subject matter in which the return floor amount 301 can be calculated as in proportion to one of four values. Specifically, the return floor amount 301 can be in proportion to: a desired minimum dollar amount in tax credits 302 earned based upon the project; a desired pre-tax project cash-flow 303 associated with the project; a desired post-tax project cash-flow 304 associated with the project; or a desired minimum project dividend 305 associated with the project. If the return floor amount 301 is calculated on an after-tax basis, then it can include the after-tax value of the tax credits that can be available at the state or federal level. Further, after considering various stress tests and project variables, such as, but not limited to, plant availability based on forecasts for wind speed at the project site, the guarantor can set the return floor amount 301 at a level such that he/she, based on the guarantor's perceived risk in the project, does not believe themselves to be materially at risk.

At 202, a premium amount can be accepted from the investor in the wind power generation project. That premium payment can be an amount agreed upon by the investor and guarantor and can represent the price that the investor is willing to pay the guarantor to provide the guarantee. The premium amount can be unique for each project and, as such can be based upon the guarantor's perceived risk in the project, the return floor amount that was previously agreed upon, as well as other market factors, such as whether the guarantor has guaranteed other projects or whether other guarantors are willing to guarantee the project at lower rates. Further, the premium can be based on the guarantor's counterparty risk, or the risk to the guarantor that the investor will not be able fulfill its obligations.

In some embodiments, the guarantee can last for an agreed upon term. That term can be any amount of time, such as a single year, 5 years, or 10 years. The term can be renewable, early-terminable, or subject to default or other provisions as may be usual and customary in the mutual agreement of the investor and guarantor. A renewal option can allow the investor to extend the guarantee term based on a set of criteria mutually agreed upon by the investor and guarantor. The length of the term can also be based upon the availability of certain risk mitigants to the guarantor, or the investors, as are later discussed. Moreover, in some embodiments a premium amount, or portion thereof, can be paid for each period within the agreed upon term. A period can be any amount of time, such as a month or a year. For example, a guarantee can last for a term of 10 years, with 1 year periods. Within each of the 1 year periods during the 10 year term, a premium, or portion thereof, can be paid to the guarantor.

Figure 4:
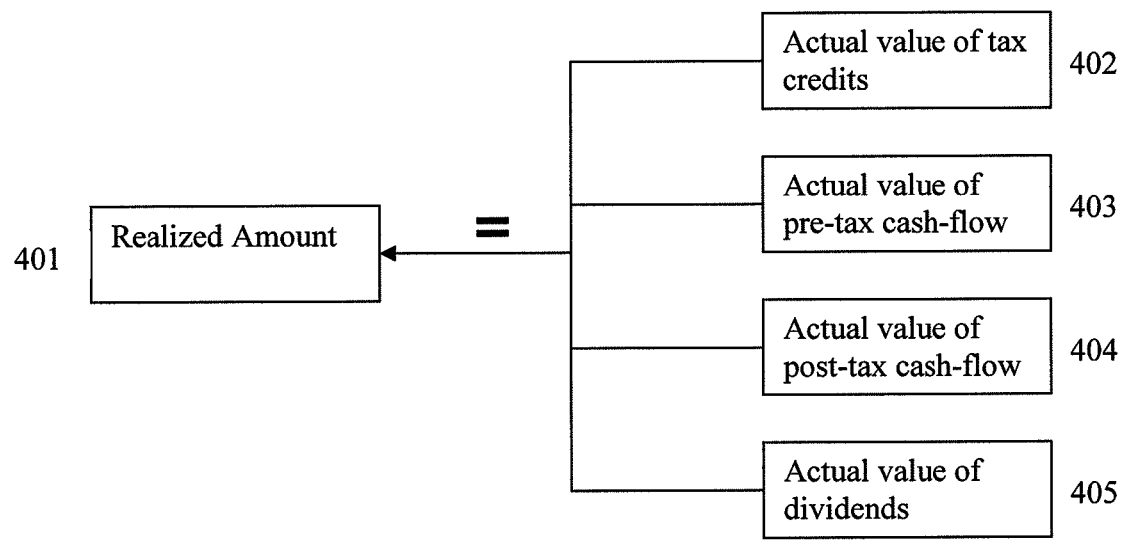
FIG. 4 is a flow chart depicting an embodiment of the disclosed subject matter in which the realized amount is calculated.

At 203, if the realized amount is less than the return floor amount, the guarantor can pay the investor the difference between the realized amount and the return floor amount. The realized amount is the actual benefit derived from the project using the metric that was used to establish the return floor amount. FIG. 4 depicts an embodiment of the disclosed subject matter in which the realized amount 401 is equal to an actual value or benefit resulting from the wind power generation product. The realized amount 401 can be equal to: the actual value of tax credits earned 402 by the wind power generation project; the actual value of pre-tax cash-flow 403 produced by the project; the actual value of post-tax cash-flow 404 produced by the project; or the actual value of dividends 405 resulting from the project. In some embodiments, the guarantor can, with mutual agreement prior to the execution of the guarantee, delay payment of this difference in return for a reduction on the premium payment of a future period. In certain embodiments, if both the investor and guarantor are members of the International Swaps and Derivatives Association ("ISDA") then ISDA derivatives documentation can be used and modified with an appropriate ISDA Supplement.

Figure 5:
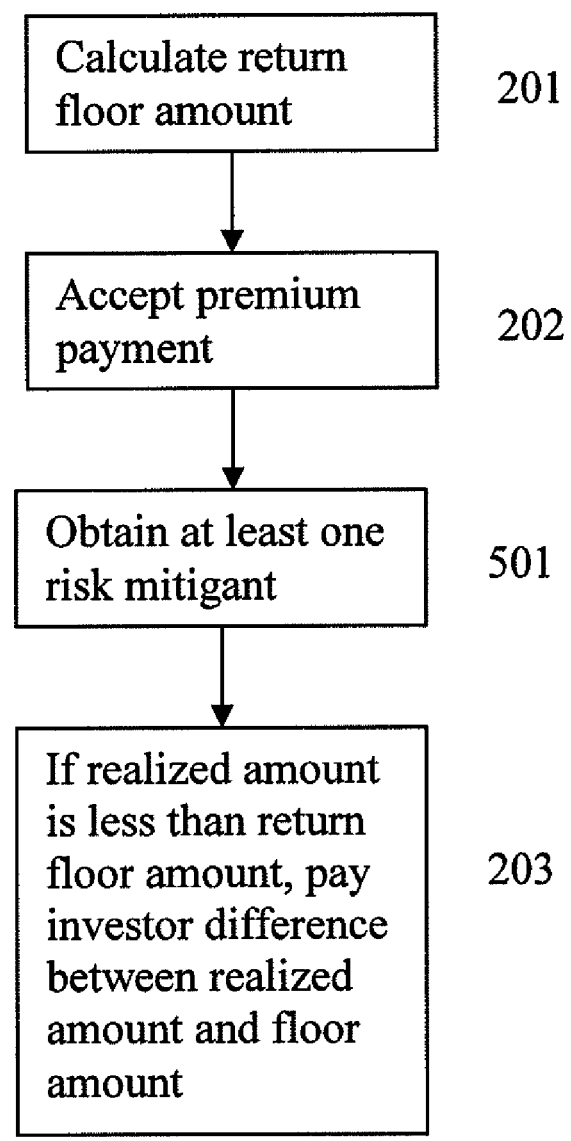
FIG. 5 is a flow chart depicting an embodiment of the disclosed subject matter in which at least one risk mitigant is obtained by the guarantor.

FIG. 5 is a flow chart depicting an embodiment of the disclosed subject matter in which, at 501, at least one risk mitigant is obtained by the guarantor. In some embodiments, the guarantor will mitigate his/her risk on the wind power generation project by investing in one or more structural supports, for which either the guarantor or the project company can be the beneficiary. In further embodiments, the costs of such structural supports can be passed through to the investor. In yet further embodiments, the investor may be required by the guarantor to obtain structural supports with terms and conditions that meet the guarantor's criteria. In this way, the investor can bear the risk of the wind power generation project as may be required by the tax code. Such structural supports include wind variability swaps, warranties covering the equipment to be used in the project, insurance to cover any business risks, tax indemnifications to cover the risk that tax benefits are not realized, and residual value guarantees.

In some embodiments, business risks include transmission risk and power purchase agreement/offtake risk. Moreover, other structural supports can be obtained or created by the guarantor to diminish the risk associated with the project to an acceptable level. In some embodiments, the wind variability swap can have a term of 5 or 10 years. The wind variability swap can have settlement based on on-site measurements of wind at the same height as the hub of any wind-turbines used at the designated wind power generation facility. Wind power generation equipment, such as turbines, can perform at levels below that suggested or estimated by an equipment manufacturer. Therefore, in some embodiments, an equipment insurance contract can be obtained to provide mitigation of risk for a predetermined period of time, such as 5 or 10 years. Finally, in some embodiments, residual value guarantees may be obtained to ensure that the value of the investment is not diminished beyond a preset point. Such residual value guarantees can take the form of either put options on the investment itself, or a residual value insurance policy.

The availability, and limitations, of risk mitigants can affect the premium amounts, the return floor amount, and the agreed term. For example, if a wind variability swap is only available for a term of 5 years, the guarantor can offer a guarantee limited to that term. In some embodiments, the guarantor can offer a longer guarantee, but condition the agreed premium amount on the renewability of the wind variability swap, or alternatively offer a shorter term that is renewable with the agreed premium amounts to reflect any changes to the wind variability swap cost. Such variability of the agreed term, premium amounts, and return floor amount can be affected by specific conditions of any of the risk mitigants.

The dollar amount in tax credits 302, which can be a basis for determining the return floor amount, reflects the availability of certain tax benefits to investors in certain renewable energy sources. Generally, under U.S. law, "the renewable electricity production credit for any taxable year is an amount equal to the product of (1) 1.5 cents, multiplied by (2) the kilowatt hours of electricity—(A) produced by the taxpayer—(i) from qualified energy resources, and (ii) at a qualified facility during the 10-year period beginning on the date the facility was originally placed in service, and (B) sold by the taxpayer to an unrelated person during the taxable year." 26 U.S.C. S 45(a). Moreover, wind is considered a "qualified energy resource." 26 U.S.C. S 45(c)(1)(A). Therefore, an equity investor in wind power generation projects can be eligible to receive tax credits. Additionally, some states provide similar tax incentives, which can also be used in calculating the return floor amount. However, there is a risk that the investor will not have adequate taxable income to take advantage of the credits as they are generated. In some embodiments, the tax benefits may have to be carried forward and therefore used to offset any payment that the guarantor would owe due to failure to meet the return floor amount. Further, there is a risk that the project itself will not qualify for the tax credits because of non-conformity with the tax code. In some embodiments, as described above, the guarantor can mitigate against this risk by obtaining tax indemnification. In some embodiments, the investor can also obtain insurance against this risk. Moreover, in an embodiment where an investor is a non-equity investor, such investor may require the procurement of insurance against failure to conform with the relevant tax code.

Figure 8:
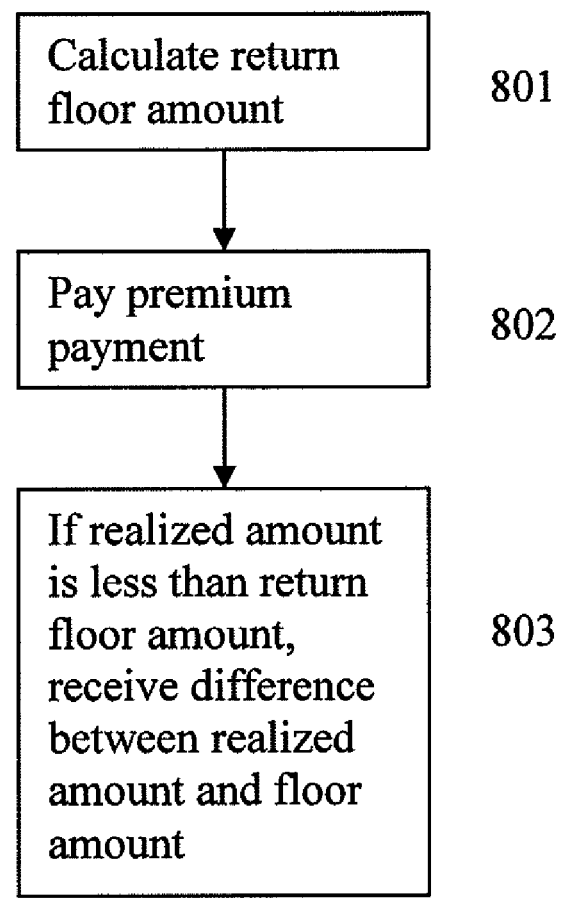
FIG. 8 is a flow chart depicting a second embodiment of the disclosed subject matter in which the risk of an investment in wind power generation is shifted.

FIG. 8 is a flow chart depicting an embodiment of the disclosed subject matter in which risk in a wind power generation project is mitigated by an investor. At 801, a return floor amount is calculated. Embodiments for calculating a return floor amount are disclosed above. At 802 a premium amount is paid to a guarantor. The premium payment can be a unique amount agreed upon by the investor and guarantor and can represent the price that the investor is willing to pay the guarantor to provide the guarantee. The premium amount can be unique for each project and, as such can be based upon the guarantor's perceived risk in the project, the return floor amount that was previously agreed upon, as well as other market factors, such as whether the guarantor has guaranteed other projects or whether other guarantors are willing to guarantee the project at lower rates. At 803, if the realized amount is less than the return floor amount, the guarantor can pay the investor the difference between the realized amount and the return floor amount. The realized amount is the actual benefit derived from the project using the metric that was used to establish the return floor amount. Embodiments for calculating the realized amount are disclosed above.

Figure 9:
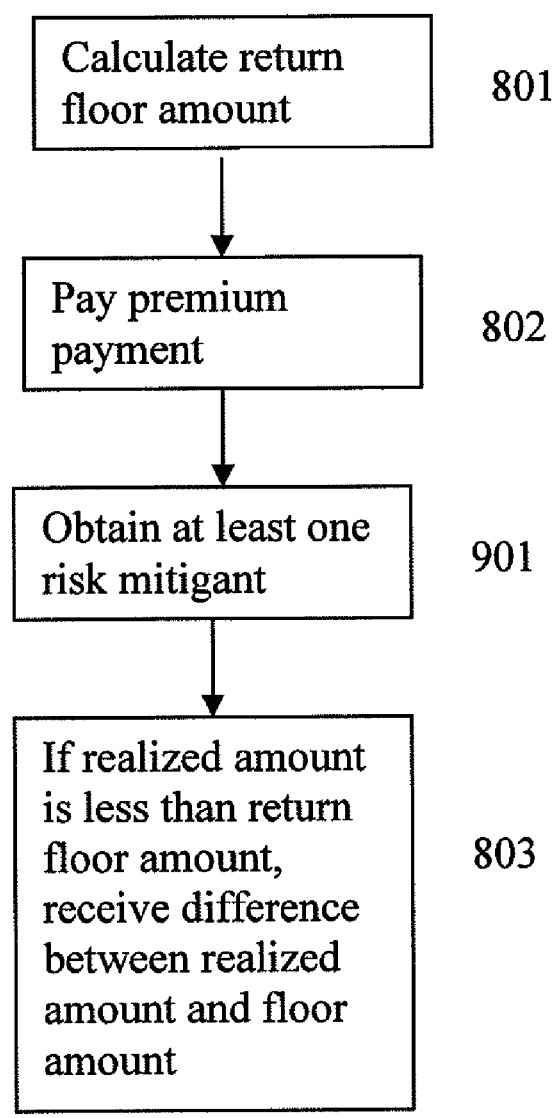
FIG. 9 is a flow chart depicting an embodiment of the disclosed subject matter in which at least one risk mitigant is obtained by the investor.

FIG. 9 is a flow chart depicting an embodiment of the disclosed subject matter in which, at 901, at least one risk mitigant is obtained by the investor. In some embodiments, the investor will mitigate his/her risk on the wind power generation project by investing in one or more structural supports, for which either the guarantor or the investor can be the beneficiary. In yet further embodiments, the investor may be required by the guarantor to obtain structural supports with terms and conditions that meet the guarantor's criteria. In this way, the investor can bear the risk of the wind power generation project as may be required by the tax code. Such structural supports include wind variability swaps, warranties covering the equipment to be used in the project, insurance to cover any business risks, tax indemnifications to cover the risk that tax benefits are not realized, and residual value guarantees.

According to the disclosed subject matter, an investor can be an individual investor or a plurality of investors. Additionally, an investor can be an equity or a non-equity investor, and can also utilize a direct or indirect interest in a consolidated or non-consolidated special purpose entity, such as a Limited Liability Partnership or a Limited Liability Corporation among others. In yet further embodiments, the guarantor can form a direct or indirectly controlled special purpose entity such as a captive insurance company to provide the guarantee. That special purpose entity would then be the beneficiary of any structural support and would also require support from a highly rated entity within the parent company's corporate structure.

Figure 6:
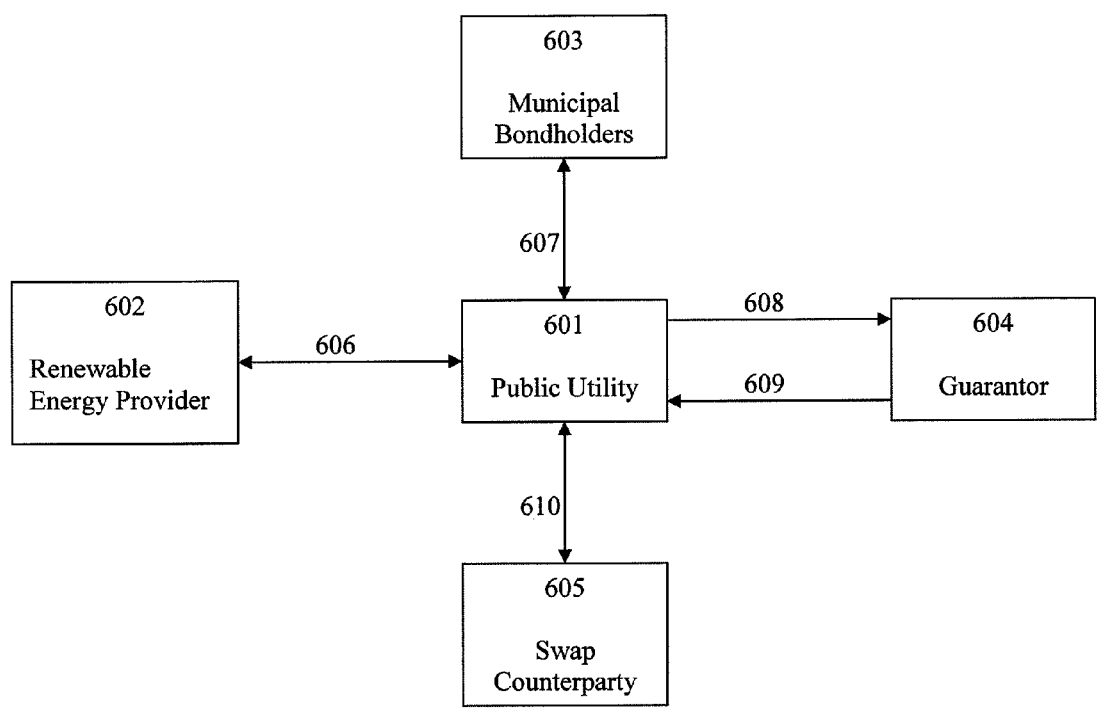
FIG. 6 is a relational diagram depicting one embodiment of the disclosed subject matter facilitating the purchase of renewable energy.

According to some embodiments of the disclosed subject matter, the purchase of renewable energy, including but not limited to wind energy, by public utilities can be facilitated. FIG. 6 is a relational diagram depicting one embodiment of the disclosed subject matter. A public utility 601 can enter into a power purchase agreement 606 with a renewable energy provider 602. This power purchase agreement can include a prepayment from the public utility 601 in exchange for a forward fixed supply of energy as well as renewable energy attributes from the renewable energy provider 602. To find at least part of the purchase of power, the public utility 610 can issue floating or fixed rate debt 607 to municipal bondholders 603. To cover any risk associated with the renewable energy provider 602, the public utility 601 can contract with a guarantor 604 for a guarantee. In return for a fixed payment amount 608, to be agreed upon by the public utility 601 and guarantor 604, the guarantor 604 can provide a guarantee that the supply of energy and/or renewable energy attributes will meet a return floor amount. In some embodiments, if the supply of energy and/or renewable energy attributes are not greater than the return floor amount, the guarantor 604 can pay the public utility 601 the difference 609 between the return floor amount and the value of the supply of energy and/or renewable energy attributes. The guarantor 604 can also arrange for a credit enhancement for project risks of the renewable energy provider 602 that flow through the public utility 601. If the debt is floating rate, the public utility 601 can execute an interest rate swap-to fixed 610 on the floating rate debt with a swap counterparty 605. This swap 610 with a swap counterparty 605 can hedge against the risk of changes to the floating point debt issued 607 to municipal bondholders 603.

Figure 7:
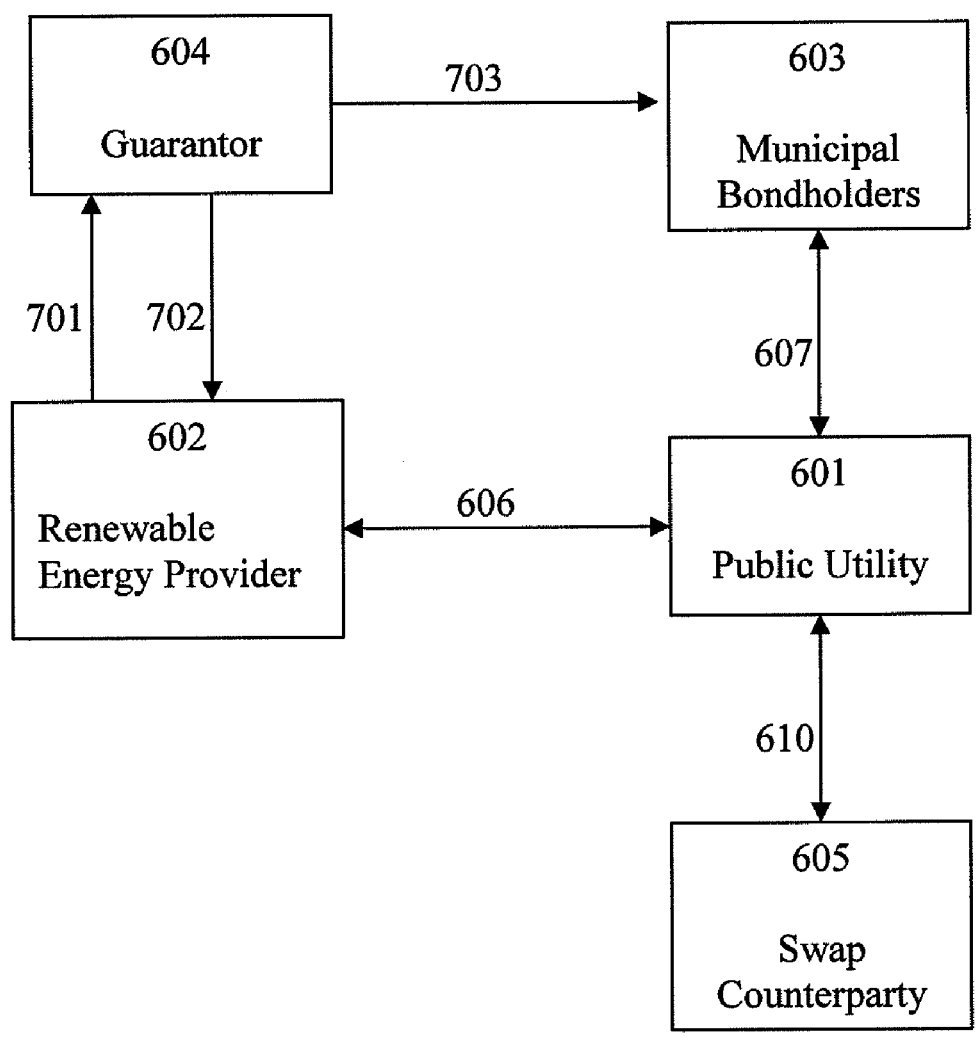
FIG. 7 is a relational diagram depicting a second embodiment of the disclosed subject matter facilitating the purchase of renewable energy.

FIG. 7 is a relational diagram depicting another embodiment of the disclosed subject matter facilitating the purchase of renewable energy. A public utility 601 can enter into a power purchase agreement 606 with a renewable energy provider 602. This power purchase agreement can include a prepayment from the public utility 601 in exchange for a forward fixed supply of energy as well as renewable energy attributes from the renewable energy provider 602. To fund at least part of the purchase of power, the public utility 610 can issue floating rate debt 607 to municipal bondholders 603. To cover any risk associated with the renewable energy provider 602, the renewable energy provider 602 can contract with a guarantor 604 for a guarantee. In return for a fixed payment amount 608, to be agreed upon by the renewable energy provider 602 and the guarantor 604, the guarantor 604 can provide a guarantee that the supply of energy and/or renewable energy attributes will meet a return floor amount. The guarantor can set criteria for structural support and either i) the guarantor ii) the public utility or iii) the investor can contract for the structural supports described herein. In some embodiments, if the supply of energy and/or renewable energy attributes are not greater than the return floor amount, the guarantor 604 can pay the renewable energy provider 602 and/or the municipal bondholders 603 a proportion of the difference 701, 703 between the return floor amount and the value of the supply of energy and/or renewable energy attributes. The guarantor 604 can also arrange for a credit enhancement for project risks that flow through the renewable energy provider 602 and the municipal bondholders 603. The public utility 601 can execute an interest rate swap-to fixed 610 on the floating rate debt with a swap counterparty 605. This swap 610 with a swap counterparty 605 can hedge against the risk of changes to the floating point debt issued 607 to municipal bondholders 603.

Some, or all, of the embodiments of the disclosed subject matter can be carried out by a processor. Such a processor can be, but is not limited to, a microprocessor, an integrated circuit, a virtual machine, or any other equipment or algorithm capable of carrying out a set of instructions. Such instructions can be stored on any medium capable of being read by a processor or computer. Such medium can be a hard drive, a main frame, a flash drive, a diskette, or any other form of computer readable memory media.

Although the present invention has been described with reference to certain preferred embodiments, various modifications, alterations, and substitutions will be known or obvious to those skilled in the art without departing from the spirit and scope of the invention.

What is claimed is:

1. A method for shifting at least a portion of the risk of an investment in a wind power generation project from an investor to a guarantor, comprising:
   a) determining a premium amount to be paid by an investor in said project to a guarantor;
   b) calculating a total return floor amount equal to an amount selected from the group consisting of: a minimum dollar amount for tax credits earned based on said project's power sales; a pre-tax cash flow amount associated with said project; a post-tax cash flow amount associated with said project; and a dollar floor amount for project dividends to be paid to said investor;
   c) obtaining a wind variability swap associated with at least one site where said project is located;
   d) obtaining a warranty regarding power generation equipment used at at least one site where said project is located;
   e) obtaining an insurance policy regarding at least one operational risk component associated with said project;
   f) wherein said investor pays said premium amount to said guarantor in exchange for at least one guaranteed payment, said at least one guaranteed payment totaling at least said total return floor amount calculated in said step b).

2. A method for shifting at least a portion of an investment risk in a wind power generation project, comprising:
   calculating a return floor amount associated with said wind power generation project;
   accepting a premium payment amount from an investor in said wind power generation project; and
   for each of an agreed period within an agreed term, paying said investor a difference between said return floor amount and a realized amount if said return floor amount is greater than said realized amount.

3. The method of claim 2 wherein said return floor amount is in proportion to an amount selected from the group consisting of:
   a desired value of tax credits earned by said wind power generation project;
   a desired value of pre-tax cash-flow associated with said wind power generation project;
   a desired value of post-tax cash-flow associated with said wind power generation project; and
   a desired value of dividends resulting from said wind power generation project.

4. The method of claim 2 wherein said realized amount is equal to an amount selected from the group consisting of:
   an actual value of tax credits earned by said wind power generation project;
   an actual value of pre-tax cash-flow produced by said wind power generation project;
   an actual value of post-tax cash-flow produced by said wind power generation project; and
   an actual value of dividends resulting from said wind power generation project.

5. The method of claim 2 wherein said premium payment amount is accepted during each of said agreed periods within said agreed term.

6. The method of claim 2 wherein said premium payment amount is calculated based at least in part upon a probability that said realized amount will be less than said return floor amount.

7. The method of claim 2 further comprising obtaining at least one risk mitigant.

8. The method of claim 7 wherein said risk mitigant is selected from the group consisting of:
   a wind variability swap;
   a warranty covering at least a portion of power generation equipment used in said wind power generation project;
   a tax indemnification associated with said wind power generation project;
   an insurance policy covering at least one business risk associated with said wind power generation project; and
   a residual value guarantee.

9. The method of claim 2 wherein said agreed term is 5 years.

10. The method of claim 2 wherein said agreed term is 10 years.

11. A method for shifting at least a portion of an investment risk in a wind power generation project comprising:
    calculating a return floor amount associated with said wind power generation project as proportional to an amount selected from the group consisting of:
    a desired value of tax credits earned by said wind power generation project;
    a desired value of pre-tax cash-flow associated with said wind power generation project;
    a desired value of post-tax cash-flow associated with said wind power generation project; and
    a desired value of dividends resulting from said wind power generation project;
    calculating a premium payment amount based at least in part upon a probability that a realized amount will be less than said return floor amount, wherein said realized amount is equal to an amount selected from the group consisting of:

an actual value of tax credits earned by said wind power generation project;
an actual value of pre-tax cash-flow produced by said wind power generation project;
an actual value of post-tax cash-flow produced by said wind power generation project; and
an actual value of dividends resulting from said wind power generation project;

accepting said premium payment amount from an investor during each of an agreed period within an agreed term;

obtaining at least one risk mitigant selected from the group consisting of:
a wind variability swap;
a warranty covering at least a portion of power generation equipment used in said wind power generation project;
a tax indemnification associated with said wind power generation project;
an insurance policy covering at least one business risk associated with said power generation project; and
a residual value guarantee;

for each of said agreed period within said agreed term, paying said investor a difference between said return floor amount and said realized amount if said return floor amount is greater than said realized amount.

12. A method for shifting at least a portion of an investment risk in a wind power generation project, comprising:
calculating a return floor amount associated with said wind power generation project;
paying a premium payment amount to a guarantor; and
for each of an agreed period within an agreed term, receiving from said guarantor a difference between said return floor amount and a realized amount if said return floor amount is greater than said realized amount.

13. The method of claim 12 wherein said return floor amount is in proportion to an amount selected from the group consisting of:
a desired value of tax credits earned by said wind power generation project;
a desired value of pre-tax cash-flow associated with said wind power generation project;
a desired value of post-tax cash-flow associated with said wind power generation project; and
a desired value of dividends resulting from said wind power generation project.

14. The method of claim 12 wherein said realized amount is equal to an amount selected from the group consisting of:
an actual value of tax credits earned by said wind power generation project;
an actual value of pre-tax cash-flow produced by said wind power generation project;
an actual value of post-tax cash-flow produced by said wind power generation project; and
an actual value of dividends resulting from said wind power generation project.

15. The method of claim 12 wherein said premium payment amount is paid during each of said agreed periods within said agreed term.

16. The method of claim 12 wherein said premium payment amount is calculated based at least in part upon a probability that said realized amount will be less than said return floor amount.

17. The method of claim 12 further comprising obtaining at least one risk mitigant.

18. The method of claim 17 wherein said risk mitigant is selected from the group consisting of:
a wind variability swap;
a warranty covering at least a portion of power generation equipment used in said wind power generation project;
a tax indemnification associated with said wind power generation project;
an insurance policy covering at least one business risk associated with said wind power generation project; and
a residual value guarantee.

19. The method of claim 12 wherein said agreed term is 5 years.

20. The method of claim 12 wherein said agreed term is 10 years.

21. A method for shifting at least a portion of an investment risk in a wind power generation project comprising:
calculating a return floor amount associated with said wind power generation project as proportional to an amount selected from the group consisting of:
a desired value of tax credits earned by said wind power generation project;
a desired value of pre-tax cash-flow associated with said wind power generation project;
a desired value of post-tax cash-flow associated with said wind power generation project; and
a desired value of dividends resulting from said wind power generation project;

calculating a premium payment amount based at least in part upon a probability that a realized amount will be less than said return floor amount, wherein said realized amount is equal to an amount selected from the group consisting of:
an actual value of tax credits earned by said wind power generation project;
an actual value of pre-tax cash-flow produced by said wind power generation project;
an actual value of post-tax cash-flow produced by said wind power generation project; and
an actual value of dividends resulting from said wind power generation project;

paying said premium payment amount to a guarantor during each of an agreed period within an agreed term;

obtaining at least one risk mitigant selected from the group consisting of:
a wind variability swap;
a warranty covering at least a portion of power generation equipment used in said wind power generation project;
a tax indemnification associated with said wind power generation project;
an insurance policy covering at least one business risk associated with said power generation project; and
a residual value guarantee;

for each of said agreed period within said agreed term, receiving from said guarantor a difference between said return floor amount and said realized amount if said return floor amount is greater than said realized amount.

22. A system for shifting at least a portion of an investment risk in a wind power generation project comprising a processor configured to:
calculate a return floor amount associated with said wind power generation project as proportional to an amount selected from the group consisting of:
a desired value of tax credits earned by said wind power generation project;
a desired value of pre-tax cash-flow associated with said wind power generation project;
a desired value of post-tax cash-flow associated with said wind power generation project; and a desired value of dividends resulting from said wind power generation project;

calculate a premium payment amount based at least in part upon a probability that a realized amount will be less than said return floor amount, wherein said realized amount is equal to an amount selected from the group consisting of:

an actual value of tax credits earned by said wind power generation project;

an actual value of pre-tax cash-flow produced by said wind power generation project;

an actual value of post-tax cash-flow produced by said wind power generation project; and an actual value of dividends resulting from said wind power generation project;

paying said premium payment amount to a guarantor during each of an agreed period within an agreed term; and for each of said agreed period within said agreed term, acknowledging receipt of payment from said guarantor a difference between said return floor amount and said realized amount if said return floor amount is greater than said realized amount.

23. A method of facilitating the purchase of renewable energy comprising:

receiving a fixed payment amount from a public utility company, said public utility company:

entering a power purchase agreement with a renewable energy supplier to receive a supply of energy and renewable energy attributes; and issuing floating rate debt to municipal bondholders;

providing a guarantee to said public utility company that said supply of energy or said renewable energy attributes will meet an agreed floor amount; and said public utility company executing an interest rate swap-to-fixed on said floating rate debt.

24. The method of claim 23 further comprising paying said public utility company at least one contingent payment if said agreed floor amount is greater than said supply of energy or said renewable energy attributes.

25. The method of claim 23 further comprising arranging a credit enhancement for risks of said renewable energy supplier held by said public utility company.

26. A method of facilitating the purchase of renewable energy comprising:

receiving a fixed payment amount from a renewable energy provider, said renewable energy provider entering a power purchase agreement with a public utility company to provide a supply of energy and renewable energy attributes, and said public utility issuing floating rate debt to municipal bondholders;

providing a guarantee to said renewable energy provider that said supply of energy or said renewable energy attributes will meet an agreed floor amount; and said public utility company executing an interest rate swap-to-fixed on said floating rate debt.

27. The method of claim 26 further comprising paying said renewable energy provider and said municipal bondholders at least one contingent payment if said agreed floor amount is greater than said supply of energy or said renewable energy attributes.

28. The method of claim 26 further comprising arranging a credit enhancement for risks of said renewable energy supplier held by said public utility company.

* * * * *